United States Patent Office 3,055,686
Patented Sept. 25, 1962

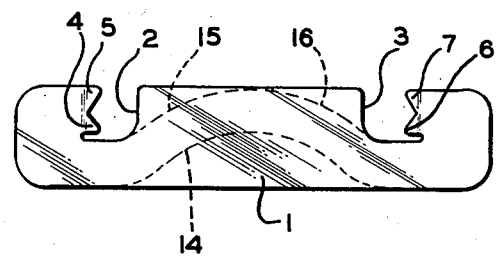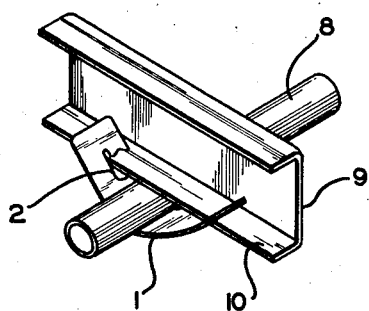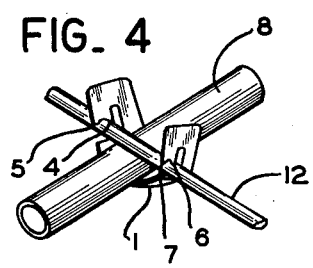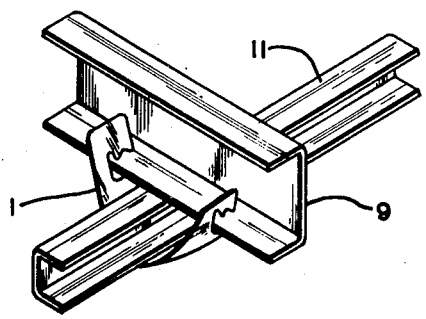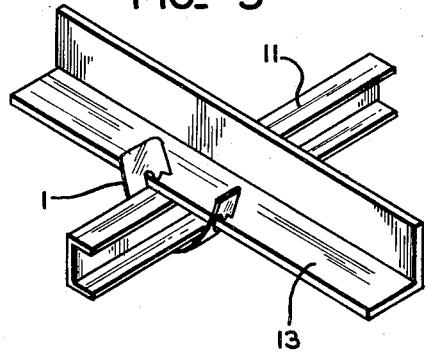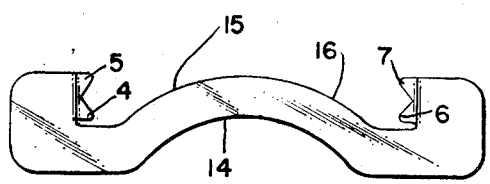

3,055,686
CLIP TYPE FASTENER
Leslie N. Havener, Euclid, Ohio, assignor to Erico Products, Inc., Cleveland, Ohio, a corporation of Ohio
Filed June 21, 1960, Ser. No. 37,791
1 Claim. (Cl. 287—51)

This invention relates as indicated to a novel clip type fastener, and more particularly to a fastener especially adapted to suspend elongated articles from supporting beams, struts and the like.

In modern building construction, there has been rapidly increasing employment of suspended ceilings which may, for example, support expanded metal lath to be plastered or appropriate elongated beams adapted to support batts of sound insulating material. Electrical and other conduit must likewise frequently be attached to or suspended from channels, rods, I-beams and angle members. Indeed, there are a multitude of applications where it is necessary thus to secure or suspend an elongated or continuous article from an appropriate support at frequently spaced intervals. It is accordingly of considerable importance that the attaching means employed be both inexpensive and very quickly and easily installed, and it is a principal object of this invention to provide such a device in the form of a clip type fastener.

A further object is to provide such clip type fastener which may be manually installed without employment of special tools and which may likewise be subsequently removed expeditiously and without damage to any of the elements, including the fastener.

Still another object is to provide such clip type fastener which will resiliently actively engage the respective members with which it is associated firmly continuously to hold the same in place without shifting or rattling.

Other objects of the invention will appear as the description proceeds.

To the accomplishment of the foregoing and related ends, said invention then comprises the features hereinafter fully described and particularly pointed out in the claim, the following description and the annexed drawing setting forth in detail certain illustrative embodiments of the invention, these being indicative, however, of but a few of the various ways in which the principle of the invention may be employed.

In said annexed drawing:

FIG. 1 is a plan view of a fastener embodying the principles of my invention, stamped from a strip of spring steel, for example;

FIG. 2 illustrates the manner of employing such fastener to support conduit from lather's channel;

FIG. 3 illustrates such fastener employed to suspend lather's channel from lather's channel;

FIG. 4 shows such fastener employed to suspend conduit from rodding;

FIG. 5 shows the fastener utilized to suspend lather's channel from an angle beam and FIG. 6 is a plan view of a modified and preferred fastener according to my invention.

Referring now more particularly to said drawing and especially FIG. 1 thereof, an embodiment of the invention there illustrated comprises a length of spring steel strip 1 notched at 2 and 3 in one side edge thereof to leave corresponding pairs of prongs 4, 5 and 6, 7 directed toward the longitudinal center portion of the strip. These prongs may, if desired, be slightly bent to one side of the strip for a purpose to be explained below. While the exact size of this clip type fastener will, of course, depend on the particular installation for which it is adapted to be employed, for the usual purposes it may be about six inches long and one and one-quarter inches wide, and .025 inch thick.

As shown in FIG. 2 of the drawing, tubular articles such as pipe or conduit 8 may be secured to lather's channel 9 by means of the fastener of this invention which is flexed about the pipe in its central portion and slid parallel to the pipe so that the flange 10 of the channel or beam 9 is received within the respective notches such as 2 with the prongs actively engaging the surface of the flange and the longitudinal central portion of the resilient strip 1 actively pressing against the underside of pipe 8 and holding the latter firmly against the underside of flange 10. The fastener thus is adapted not only to suspend an article such as pipe 8 from the supporting member such as channel or beam 9 but also to clamp such pipe rigidly to the channel in a manner to prevent shifting or rattling. Nevertheless, the fastener may be removed without difficulty simply by moving the two end portions thereof toward one another (ordinarily manually with the usual size fastener) whereupon it may be slid along pipe 8 away from channel 9 into position where the prongs will no longer engage the upper surface of flange 10 and the resilient strip 1 may return to its normal straight flat condition.

FIG. 3 shows the clip similarly employed to suspend a channel member 11 from the lather's channel or beam 9, this arrangement being particularly useful in mounting luminous ceilings and the like. As shown in FIG. 4, the pipe or conduit 8 is suspended from rod or bar 12 by means of the clip type fastener of this invention, the prongs 6, 7 and 4, 5 bearing against the upper side of rod 12 opposite pipe 8 and to a degree embracing the curved surface of rod 12 further to assist in preventing shifting of the clip longitudinally of pipe 8. As shown in FIG. 5, lather's channel 11 may be secured to or suspended from an angle beam 13 by the clip type fastener of this invention in substantially the same manner as shown in FIG. 3. As above explained, the prongs 4, 5 and 6, 7 may be somewhat bent or turned up toward the same side of strip 1, i.e. downwardly as viewed in FIGS. 2–5 inclusive better to engage and frictionally dig into the opposed surface of the supporting member. Even when sharp upturned prongs of this nature are employed, however, the fastener may readily be disengaged from the supporting member simply by squeezing the two end portions thereof toward one another.

It will thus be seen that there has been provided a novel form of clip type fastener which is simple and inexpensive of construction and capable of very quick and easy manual installation. Nevertheless, it is effective actively resiliently to engage both the supporting member and the supported article in a manner to ensure against dislodgment or rattling.

Referring now to FIG. 6 of the drawing, a modified and preferred form of spring clip of this invention may be produced by blanking out the spring steel strip along the lines 14, 15, 16 as shown in FIG. 1 so that the longitudinal central portion of the clip is aligned between the two sets of opposed prongs and the entire intermediate portion is of substantially uniform width, thereby providing a clip which is more readily manually flexed and in which the counter-pressures are evenly balanced when the clip is installed.

Other modes of applying the principle of the invention may be employed, change being made as regards the details described, provided the features stated in the following claim or the equivalent of such be employed.

I therefore particularly point out and distinctly claim as my invention:

A clip type fastener comprising a thin flat elongated strip of spring steel of substantially uniform width smoothly curved to general shallow U-shape in its own plane, the respective end portions of said strip being laterally offset to the same side and respectively provided with a pair of integral prongs projecting toward the other of said pair of prongs and generally aligned with the longitudinally central portion of such U-shape curve.

References Cited in the file of this patent

UNITED STATES PATENTS

| | | |
|---|---|---|
| 606,461 | Johnson | June 28, 1898 |
| 611,981 | Smith | Oct. 4, 1898 |
| 656,431 | Stewart | Aug. 21, 1900 |
| 812,053 | Lease | Feb. 6, 1906 |
| 977,704 | Brownlee | Dec. 6, 1910 |
| 1,683,364 | Loucks | Sept. 4, 1928 |
| 2,923,385 | Tinnerman | Feb. 2, 1960 |